Figure 1:
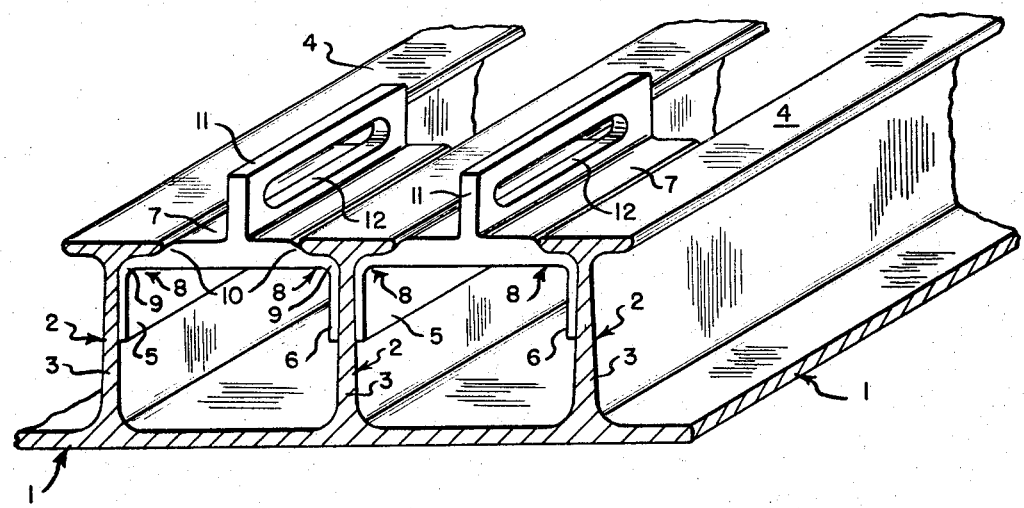

Nov. 21, 1967    C. W. YOUNG    3,353,780
CONTOURED TIE-DOWN INSERT FOR UPSTANDING T-BEAM
ELEMENTS OF A CARGO-SUPPORTING FLOOR
Filed April 25, 1966

INVENTOR.
Charles W. Young
BY
ATTORNEYS 3,353,780
CONTOURED TIE-DOWN INSERT FOR UPSTAND-
ING T-BEAM ELEMENTS OF A CARGO-SUP-
PORTING FLOOR
Charles W. Young, Catonsville, Md., assignor to Revere
Copper and Brass Incorporated, New York, N.Y., a corporation of Maryland
Filed Apr. 25, 1966, Ser. No. 544,861
3 Claims. (Cl. 248—361)

This invention relates to metal shapes for the cargo-supporting floor of vehicles and the like and, more particularly, to a contoured tie-down insert adapted to be mounted between the upstanding T-beam elements of such a floor.

In cargo vehicles such as truck trailers and railway cars, the provision of refrigeration for cooling the cargo has necessitated the development of a cargo-supporting floor which supports the cargo above the base floor so that the refrigerated atmosphere within the vehicle can be circulated below as well as around the sides and top of the cargo. The cargo-supporting floor can be provided by upstanding T-shaped supporting elements provided by I-beams formed in or secured to the base floor or they can be formed in supplemental floor sections such as are described in the United States patents to Constance No. 2,786,556, Black No. 2,923,384 and Weiler No. 2,952,341, mounted on the base floor. The supporting floor is in the form of upstanding T-shaped supporting elements which hold the cargo spaced above the vehicle floor, and the supporting elements are spaced apart to permit cold air to circulate under the thus-supported cargo. In the case of panel-like supplemental floor sections, the sections are provided with locking elements along two opposite sides to permit adjacent panels to be mechanically interlocked. The design of the panels, of the supporting elements and of the locking elements is advantageously such as to permit each entire section to be extruded or otherwise fabricated from billets of any appropriate metal such as aluminum.

Although the aforementioned cargo-supporting floor is wholly effective for its intended purpose, it nevertheless offers less contact area between the cargo and the tops of the supporting elements than would prevail if the cargo were resting upon a flat floor surface. Accordingly, there is often a need for straps or ropes to hold cargo in place on the rail-like supporting floor, and it is to the provision of tie-down brackets for this purpose that the present invention is directed.

The contoured tie-down inserts of the invention are adapted to be mounted between upstanding T-beam elements of a cargo-supporting floor. These inserts comprise two parallel side panels, a top panel, and corner elements having substantially sigma-shaped exterior surfaces integrally formed with the aforesaid panels and interconnecting the side wall panels with opposite edge portions of the top panel. One end portion of each sigma-shaped corner element is aligned with the plane of the side wall to which it is joined and the other end of the sigma-shaped corner element is aligned with the plane of the top panel to which it is joined. An upstanding flange is integrally formed with the center portion of the top panel and is provided with a tie-down opening.

Figure 2:
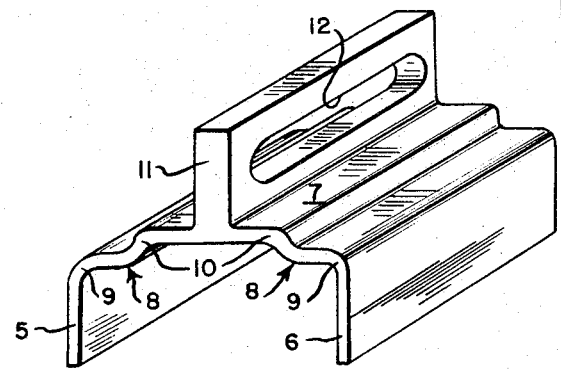

These and other novel features of the contoured tie-down insert of the invention will be more readily understood by reference to the accompanying drawing in which FIG. 1 is an isometric view of a portion of a T-beam trailer floor section showing the insertion of a contoured tie-down insert of the invention in operative position therein; and FIG. 2 is an isometric view of another modification of the contoured tie-down insert of the invention.

As shown in FIG. 1 the main floor 1, whether the base floor of a vehicle or the floor portion of panel sections laid on the base floor, is provided with a plurality of laterally spaced upstanding T-beams 2. The beams include an upstanding center wall 3 and a horizontal top flange 4 extending outwardly beyond both sides of the center wall 3. The top flange 4 is preferably flat so that a plurality of the spaced flat top flanges form a cargo-support floor above the main floor 1.

The contoured tie-down insert of the invention shown in FIGS. 1 and 2 comprises two parallel side wall panels 5 and 6 and a top panel 7 of width such as to span the distance between two adjacent T-beam flanges. Each side wall panel is integrally connected to the top panel by a flexuous or sigma-shaped corner element 8. One end portion 9 of each corner element is aligned with the plane of its attached side wall panel, and the other end portion 10 of each corner element is aligned with the plane of the attached top panel 7. The resulting corner structure of the insert, at least along its exterior surface, is provided with a sigma-shaped contour such as to complement the contour of the underside of the top flange 4 of the T-beam; in FIG. 1 only the exterior surface of the flexuous corner element 8 has the aforesaid contour, whereas in FIG. 2 the body of the walls of the insert as a whole follow this contour. The resulting corner elements in both embodiments of the invention resemble curved corners interconnecting each side wall with the adjacent edge of the top panel and with the central portion of each corner element dimpled inwardly sufficiently to conform to the contour of the underside of the T-beam flange. The top panel 7 is provided with an integrally-formed upstanding flange 11 having at least one central opening 12 through which a tie-down strap or rope may be passed or secured. The flange 11 is advantageously disposed longitudinally of the insert, as shown in the drawing, in a plane substantially parallel to and between the planes of the side walls.

The height of the insert side walls 5 and 6 is less than that of the upstanding center wall 3 of the T-beams so that the insert can be freely moved longitudinally between adjacent beams. It is particularly advantageous to have the height of the insert side walls 5 and 6 such that the sum of this height plus that of the upstanding flange 11 is no greater, or less, than the height of the top flange 4 above the main floor 1 so that when the tie-down inserts are not in use they can drop down into the space between T-beams and not extend above the level of the top flanges 4.

The contoured tie-down insert of the invention is of such shape that it can be formed readily by extrusion in long lengths. Whether so extruded or formed by bending flat stock or other procedure, I have found it advantageous to supply the inserts in relatively short lengths which can be moved longitudinally along the T-beams for most appropriate position to supply a tie-down base. The inserts of the invention do not impair the circulation of cooling air between the T-beams in refrigerated carriers or the ease of cleaning the cargo-supporting structure and are thus useful in providing tie-downs or strapping anchors for any portion or all of the cargo positioned along the cargo-supporting floor of the aforementioned type.

I claim:
1. A contoured tie-down insert adapted to be mounted between upstanding T-beam elements of a cargo-supporting floor and comprising two parallel side panels, a top panel, corner elements having substantially sigma-shaped exterior surfaces integrally formed with said panels and interconnecting the side wall panels with opposite edge portions of the top panel, one end portion of each sigma-shaped corner element being aligned with the plane of the side wall panel to which it is joined and the other end of the sigma-shaped corner element being aligned with the plane of the top panel to which it is joined, and an upstand- ing flange integrally formed with the center portion of the top panel and provided with a tie-down opening.

2. A contoured tie-down insert according to claim 1 in which the upstanding flange on the top panel lies in a plane substantially parallel to and between the planes of the side panels.

3. A contoured tie-down insert according to claim 1 in which the height of the side panels plus the height of the upstanding flange on the top panel does not exceed the height of the upstanding T-beam elements of the cargo-supporting floor.

References Cited

UNITED STATES PATENTS

| Re. 19,337 | 10/1934 | Butterworth | 105—368 |
| 2,024,444 | 12/1935 | Friedlaender | 105—368 |
| 2,047,503 | 7/1936 | Wilson et al. | 248—119 |
| 3,294,354 | 12/1966 | Batey | 248—361 |

ROY D. FRAZIER, *Primary Examiner.*

FRANK DOMOTOR, *Assistant Examiner.*